(12) United States Patent
Edmunds et al.

(10) Patent No.: US 7,740,762 B2
(45) Date of Patent: *Jun. 22, 2010

(54) TREATMENT OF SEWAGE SLUDGES

(75) Inventors: Stephanie Edmunds, Willenhall West Midlands (GB); Paul Douglas Gilbert, Whitstable Kent (GB); Robert Eric Talbot, Cannock Staffordshire (GB)

(73) Assignee: Rhodia UK Limited, Watford Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/793,303

(22) PCT Filed: Dec. 16, 2005

(86) PCT No.: PCT/EP2005/013821

§ 371 (c)(1),
(2), (4) Date: Jun. 2, 2008

(87) PCT Pub. No.: WO2006/066903

PCT Pub. Date: Jun. 29, 2006

(65) Prior Publication Data

US 2008/0257001 A1    Oct. 23, 2008

(30) Foreign Application Priority Data

Dec. 20, 2004    (GB) .................. 0427740.6

(51) Int. Cl.
*C02F 1/50*    (2006.01)
*C02F 11/00*    (2006.01)

(52) U.S. Cl. .................. 210/631; 210/764; 422/28

(58) Field of Classification Search ............ 210/764
See application file for complete search history.

(56) References Cited

U.S. PATENT DOCUMENTS

| | | | |
|---|---|---|---|
| 4,509,696 A | 4/1985 | Donaldson | |
| 4,673,509 A | 6/1987 | Davis et al. | |
| 4,966,716 A * | 10/1990 | Favstritsky et al. | 210/755 |
| 5,385,896 A * | 1/1995 | Bryan et al. | 514/129 |
| 5,422,015 A | 6/1995 | Angell et al. | |
| 5,536,410 A * | 7/1996 | Kitatsuji et al. | 210/626 |
| 5,599,461 A * | 2/1997 | Peltier et al. | 210/764 |
| 5,670,055 A * | 9/1997 | Yu et al. | 210/699 |
| 5,741,757 A | 4/1998 | Cooper et al. | |
| 6,001,158 A * | 12/1999 | Elphingstone et al. | 106/18.31 |
| 6,165,364 A * | 12/2000 | Maunuksela et al. | 210/631 |
| 7,214,292 B2 * | 5/2007 | Bowdery et al. | 162/78 |
| 7,407,590 B2 * | 8/2008 | Ludensky et al. | 210/698 |

FOREIGN PATENT DOCUMENTS

| | | |
|---|---|---|
| GB | 2228679 A | 9/1990 |
| JP | 2002-308713 | 10/2002 |
| WO | WO 03/021031 A1 | 3/2003 |
| WO | WO 2004/113237 A1 | 12/2004 |

OTHER PUBLICATIONS

Rutishauser et al. "Phosphine Formation from Sewage Sludge Cultures", Anaerobe, Oct. 1999, pp. 525-531, vol. 5, No. 5.
International Search Report corresponding to PCT/EP 2005/013821.

* cited by examiner

*Primary Examiner*—Peter A Hruskoci
(74) *Attorney, Agent, or Firm*—Buchanan Ingersoll & Rooney PC

(57) ABSTRACT

The present invention provides a method of reducing the pathogen content of sewage sludge comprising (a) adding to the sludge an effective amount of a phosphorous-containing compound and (b) keeping the phosphorous-containing compound in contact with the sludge for a sufficient time to reduce the amount of pathogens present in the sludge by an amount equivalent to a logarithmic reduction of 2 or more.

39 Claims, 4 Drawing Sheets

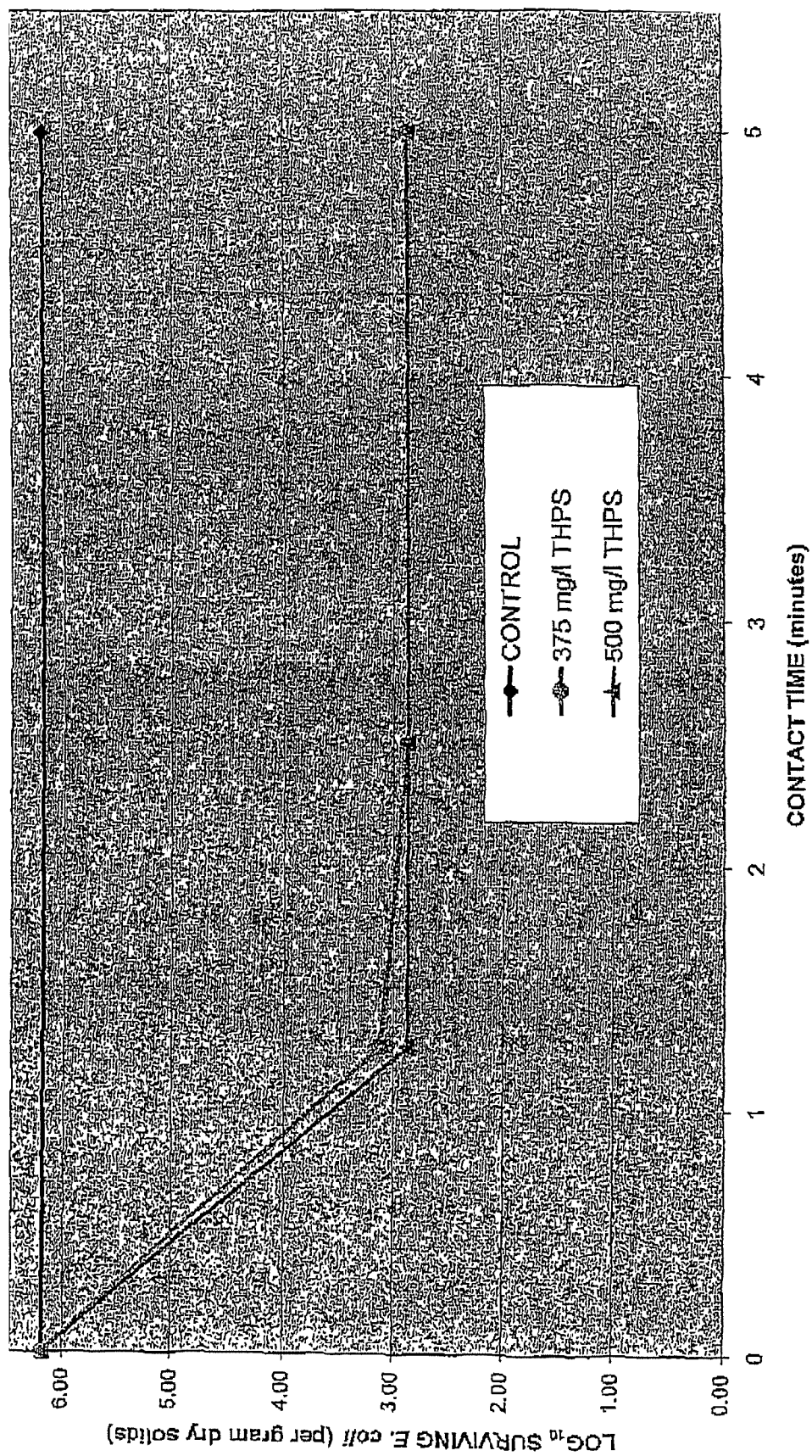

TREATMENT OF SEWAGE SLUDGES

CROSS-REFERENCE TO PRIORITY APPLICATIONS

This application claims priority under 35 U.S.C. §119 of British Application No. GB 0427740.6, filed Dec. 20, 2004, and is the National Phase of PCT/EP 2005/013821, filed Dec. 16, 2005 and designating the United States, published on Jun. 29, 2006 as WO 2006/066903 A1, each hereby expressly incorporated by reference in its entirety and each assigned to the assignee hereof.

This invention relates to a method of treating sewage sludge and to a sludge treated by the aforesaid method.

The treatment of raw sewage generally includes a filtration or settling stage (in which large solids and grit are removed) followed by a stage in which the aqueous phase is subjected to aerobic bacterial action to remove biodegradable substances. This latter stage involves "activated sludge" which is essentially a concentrated bacterial mass. Biodegradable substances need to be removed prior to the discharge of the aqueous phase into watercourses, e.g. rivers, otherwise the bacterial degradation of such substances in the river would consume dissolved oxygen resulting in fish deaths, odours and general degradation of the environment. During the degradation of the biodegradable substances, growth and multiplication of the bacteria occur, resulting in the accumulation of bacterial sludge requiring disposal.

Optionally, the excess sludge may be "digested" under anaerobic conditions where, essentially, the bacteria re-equilibrate under the new conditions to produce methane and reduce the biomass but, ultimately, there remains an irreducible mass of excess sludge which requires disposal. There are a number of methods of disposal, such as landfill and disposal at sea, both of which are disfavoured for environmental reasons. Alternatively, the excess sludge may be incinerated (expensive) or spread on to agricultural land and, in the latter case, the sludge can be used as a fertiliser/soil conditioner, which is a benefit.

Unfortunately, such sludge can contain significant concentrations of pathogens and, if so, the sludge requires disinfection to reduce to an acceptable environmental and sanitary level any pathogenic organisms present, before the disinfected sludge is spread to land. An indicator organism, used to quantify the pathogenic risk, is *E. coli*. For compliance with UK statutory provisions, for conventional treated sludge the level of *E. coli* in the sludge must be reduced by 99% (i.e. a logarithmic reduction of 2) and the maximum acceptable level of *E. coli* in the treated sewage sludge is 1 per gram of dry sludge (gds). For enhanced treated sludge in the UK there should be no *Salmonella* spp present and the level of *E. coli* must be reduced by at least 99.9999% (i.e. a logarithmic reduction of 6). The maximum acceptable level of *E. coli* in the enhanced treated sewage sludge is $10^3$ per gram of dry sludge. Similar statutory requirements are expected to be adopted across Europe and in the USA in the future.

Bacterial reduction may be accomplished in a variety of ways including lime treatment (messy, requires significant capital investment and poses severe handling problems), heat treatment (very expensive) or merely leaving the sludge in storage till the bacterial level falls within the required limit. For the latter situation, the very large volumes of sludge involved at most sewage treatment works cannot usually be stored for the requisite time due to insufficient storage capacity. Installing sufficient capacity is either impractical due to space considerations or involves large capital expenditure.

In theory, an alternative method of reducing the bacterial content of the sludge would be to apply a disinfectant. However, disinfectants evaluated hitherto have been found to take relatively long periods to reduce the bacterial content to an acceptable level, thus creating storage demands beyond the resources of most sewage-treatment works. The use of disinfectants is also expensive.

We have found that the use of a phosphorus-containing compound (especially a phosphonium salt), alone or in combination with other treatments, on sewage sludge can bring about an overall reduction in the pathogen content of the treated sludge compared to the raw untreated sludge equivalent to a logarithmic decrease of at least 2.

FIG. 4 illustrates the performance of Phosphonium Salt for treating raw untreated sewage that has not undergone pre-treatment steps such as anaerobic digestion.

Figure 1:
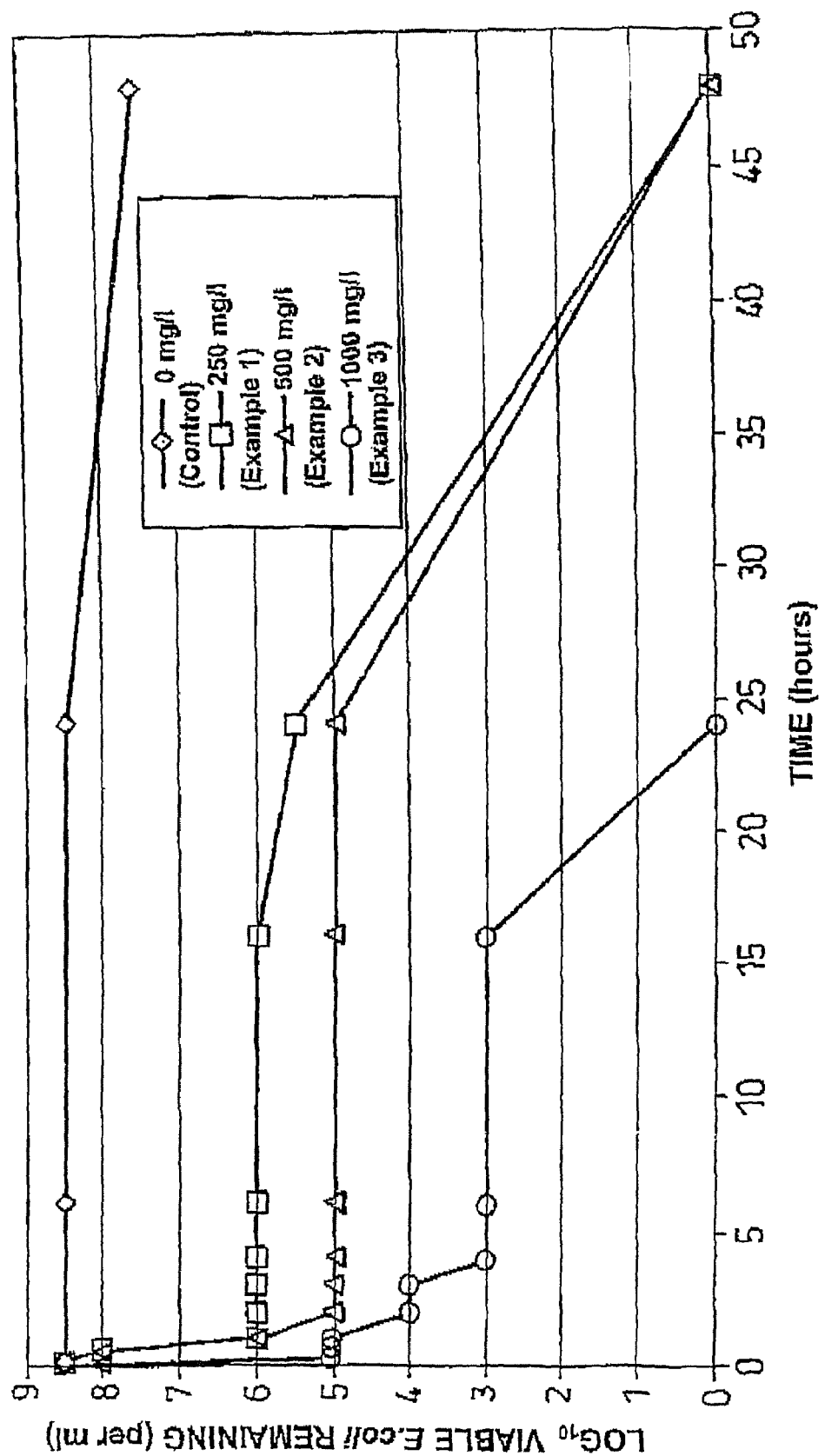
FIG. 1 illustrates performance of Phosphonium Salt in the concentration range 250 to 1000 mg/l.

Accordingly in a first aspect, the present invention provides a method of treating sewage sludge to reduce the pathogen content of said sludge, the method comprising the steps of:
(a) adding to the sludge an effective amount of a phosphorus-containing compound; and
(b) keeping the phosphorus-containing compound in contact with the sludge for sufficient time to give rise to a finally treated sludge wherein the total reduction in the amount of pathogens present is by an amount equivalent to a logarithmic (log) reduction of 2 or more compared to the amount of pathogens present in untreated sludge.

In one embodiment the phosphorus-containing compound may be added to untreated (raw) sewage sludge. The phosphorus-containing compound is preferably added in an amount sufficient to reduce the total amount of pathogens in the untreated sewage sludge by an amount equivalent to a logarithmic reduction of 2 or more.

In a second embodiment the phosphorus-containing compound may be added to sewage sludge that has already undergone one or more treatments to reduce the total amount of pathogens present, this sludge is hereinafter referred to as "pre-treated sludge". A preferred treatment used to give rise to pretreated sludge is anaerobic digestion.

The phosphorus-containing compound is preferably added to the pre-treated sludge in an amount effective to reduce the amount of pathogens present in the pre-treated sludge such that the total reduction of the pathogen content, after pre-treatment and treatment with the phosphorus-containing compound, compared to the untreated sludge is by an amount equivalent to a logarithmic reduction of 2 or more.

In a further embodiment the phosphorus-containing compound is kept in contact with the pre-treated sludge for a sufficient time to give rise to a total reduction in pathogen content compared to the untreated sludge by an amount equivalent to a logarithmic reduction of 2 or more; and the total reduction in pathogen content achieved by the addition of the phosphorus-containing compound is by an amount equivalent to a logarithmic reduction of less than 2.

Accordingly, for example, the untreated sewage sludge may have undergone an anaerobic digestion treatment prior to step (a). The anaerobic digestion step could, for example, give rise to a reduction in the pathogen content by an amount equivalent to a logarithmic reduction of 1.0 to 1.8, preferably 1.5. The untreated sludge after treatment by an anaerobic digestion step would be known as pre-treated sludge. A phosphorus-containing compound would then be added to the pre-treated sludge to further reduce the pathogen content. The phosphorus-containing compound would give rise to a further reduction in the pathogen content by an amount equivalent to a logarithmic reduction of 0.2 to 1.0 or more, preferably 0.5 or more, respectively compared to the pathogen content of the untreated sludge. This process would give rise to a total reduction in the pathogen content of the sludge by an amount equivalent to a logarithmic reduction of 2 or more compared to the pathogen content of the untreated sludge to give a finally treated sludge.

Preferably the method according to the present invention provides a reduction in pathogen content by an amount equivalent to from a two to a six log reduction of the pathogen content present in the finally treated sludge, after treatment by the method of the present invention, compared to the pathogen content of the untreated sludge.

Preferably, the phosphorus-containing compound is kept in contact with the sludge for sufficient time to reduce the total amount of pathogens present in the sludge, compared to the raw untreated sludge, by a log reduction of 3 or more and more preferably 4 or more.

Preferably the phosphorus-containing compound is an organophosphorus compound.

Preferably, the phosphorus-containing compound is a phosphonium compound, especially a tetrakis(hydroxyorgano)phosphonium salt or compound of formula (I)

$$[R'R''(CH_2OH)_2P^+]_n X^{n-} \quad (I)$$

wherein:

n is the valency of X;

R' and R", which may be the same or different, are selected from an alkyl, hydroxyalkyl, alkenyl or aryl moiety and X is an anion.

R' and R" are preferably between 1 and 20 carbon atoms in length.

X is preferably selected from the group consisting of chloride, sulphate, phosphate, acetate, oxalate and bromide.

Most preferably, the phosphonium compound is tetrakis(hydroxymethyl)phosphonium sulphate.

Alternatively, the phosphonium compound may be, for example, a tetrakis(hydroxymethyl)phosphonium chloride, tetrakis(hydroxymethyl)phosphonium bromide, tetrakis(hydroxymethyl)phosphonium phosphate, tetrakis(hydroxymethyl)phosphonium acetate or tetrakis(hydroxymethyl)phosphonium oxalate.

Alternatively, the phosphorus-containing compound may be an alkyl-substituted phosphine, e.g. tris(hydroxymethyl) phosphine as shown in formula (II):

$$(CH_2OHR_2)P \quad (II)$$

wherein:

each R, which may be the same or different, is selected from a alkyl, hydroxyalkyl, alkenyl or aryl moiety.

The amount of phosphorus-containing compound to be added to the sludge in step (a) of the method of the present invention is suitably up to 10000 mg/l, preferably 100-2500 mg/l, and especially 200-1000 mg/l.

Alternatively, the amount of phosphorus-containing compound to be added to the sludge may be expressed relative to dry solids weight. Suitably, the amount to be added is up to about 30% by weight of dry solids. Preferably, the amount of phosphorus-containing compound to be added may be from 0.1 to 20%, for example, 0.1 to 10%, such as 0.2 to 5% or 0.4 to 2% by weight of dry solids.

Step (b) of the method of the present invention may be carried out over a period of from 1 second to 14 days. For example, from 6 to 24 hours, from 1 to 6 hours, from 1 to 60 minutes, from 1 to 60 seconds or from 1 to 15 seconds.

The log reduction in the total pathogen content may be measured based on liquid sludge such that the finally treated liquid sludge obtained after treatment by the method of the present invention has a total pathogen level reduction of an amount equivalent to a logarithmic reduction of 2 or more. Liquid sludge is herein defined as having a solid content of from 1 to 4% by weight.

Preferably the total reduction in pathogen content equivalent to a log reduction of 2 or more achieved by the method of the present invention is achieved in a time period that is shorter than the time period required if a phosphorus containing compound is not used. For example, the total reduction in pathogen content equivalent to a log reduction of 2 or more achieved by the method of the present invention is preferably achieved over a 20 to 30 hour period, most preferably over a 24 hour period.

Alternatively the log reduction in the total pathogen content may be measured based on a sludge cake such that the finally treated sludge obtained after treatment by the method of the present invention has a total pathogen level reduction, when dried to form a sludge cake, of an amount equivalent to a logarithmic reduction of 2 or more. Sludge cake is herein defined as having a solid content of from 20 to 30% by weight.

Preferably the total reduction in pathogen content equivalent to a log reduction of 2 or more achieved by the method of the present invention is achieved in a time period that is shorter than the time period required if a phosphorus-containing compound is not used.

The present method therefore ensures that whether the treated sludge is being used in the form of a liquid or a cake the necessary reduction in pathogen levels is achieved to allow the treated sludge to be used as required.

The rate of addition of the phosphorus-containing compound and the rate of mixing are important in maximising the efficacy of the process. To maximise efficacy, both should be as short as practically possible and contact time should be maximised.

In processes involving natural gravity settling of the sewage sludge step (b) is preferably 6 to 24 hours. In processes where the treated sludge is, optionally, dewatered by, e.g. centrifuge or filter press, to produce 'sludge cake', step (b) is preferably carried out in 15 seconds to 24 hours. Dewatering aids such as polydiallyl-dimethyl ammonium chlorides, polyamines, cationised polyacrylamides and anionic polyacrylamides may be utilised in the production of sludge cake.

The pathogens present in the sludge are suitably selected from the group including:

bacteria, including *Escherichia coli*, *Salmonella* spp., *Shigella* spp., *Vibrio cholerae*, *Bacillus cereus*, *Listeria monocytogenes*, *Campylobacter* spp and *Yersinia pestis*;

viruses, including rotaviruses, caliciviruses, group F adenoviruses and astroviruses; protozoans, including *Entamoeba* spp., *Giardia* spp., *Balantidium coli* and *Cryptosporidium* spp.; and helminths and their eggs, including nematodes, for example, *Ascaris lumbricoides* (roundworm), *Trichuris trichiura* (whipworm), *Ancylostoma duodenale* (hookworm), *Strongyloides stercoralis* (threadworm); trematodes, for example, *Schistosoma* spp.; and cestodes, for example, *Taenia saginata* (beef tapeworm) and *Taenia solum* (pork tapeworm).

The present invention further provides a sewage sludge that has been treated according to the method described hereinabove. The sewage sludge may be liquid sludge or it may be a sludge cake.

The present invention will be illustrated by way of the following Examples.

In the Examples, the phosphorus-containing compound used to treat sewage sludge was 75% w/w tetrakis(hydroxymethyl)phosphonium sulphate, available from Rhodia Consumer Specialties Limited. For the purposes of this patent specification, the product will be subsequently referred to as "Phosphonium Salt".

As a comparison, sewage sludges were treated with a conventional disinfectant compound, dibromo-nitrilo-propionamide (DBNPA).

In each Example, the bacterium being observed was *E. coli*.

EXAMPLES 1 TO 4

1.1 Methodology

The methodology adopted to evaluate biocide performance was by Quantitative Suspension Test (QST) using sterile anaerobic digester sludge as the QST medium, back-inoculated with *E. coli* cultures previously isolated from the sludge. In this way, a consistent chemical environment (sterile sludge) could be used in conjunction with a defined bacterial challenge. This enables the provision of consistency between tests.

1.2 Microbiological Evaluations

Sterile sludge was prepared from raw sludge samples by autoclaving at 121° C. for 20 minutes. The *E. coli* strains used in QST had been isolated from raw sludge samples.

QST were performed as follows:

Sterile sludge (19 ml) was dispensed into sterile, screw-cap, plastics universal bottles of nominal 30 ml capacity.

To each sample was added 0.5 ml of a washed cell suspension of *E. coli* prepared from a 16-hour culture incubated at 44° C. in Tryptose Soy Broth, which had been centrifuged (14500 rpm for 10 min.) and re-suspended in sterile phosphate buffer (0.2M at pH 7.2). An inoculum of 0.5 ml was sufficient to provide a final cell concentration of about $10^8$ per ml in 20 ml of QST medium.

Fresh stock solutions of the candidate treatment chemicals were prepared in sterile phosphate buffer (0.2M at pH 7.2) at concentrations such that when 0.5 ml was added to the QST medium (final volume 20 ml) the desired final concentration of biocide was achieved.

The QST medium was mixed thoroughly and held at 22° C. for the duration of the test.

At intervals during the test, the sludge was well mixed and samples (11.0 ml) were removed from the QST medium and inoculated into the first tube of a dilution series containing MacConkey broth supplemented with sodium thiosulphate (5.0 g/l), to inactivate any residual biocide carried into the dilution series. This was carried out in duplicate.

The remainder of the serial dilution (10 fold steps) was carried out in MacConkey Broth alone and tubes incubated at 44° C. for 16 hours. The end point was scored as the highest dilution in the series to show a change in colour from purple to yellow and to have developed turbidity.

MacConkey Broth was selected as this medium contains the pH indicator Bromocresol Purple that changes from purple to yellow as the medium becomes acidic. This is a useful indirect indicator of microbial growth (organic acid production) where this cannot be scored by the development of turbidity in an initially clear medium. Because the sludge contains suspended solids the first 2 tubes of the dilution series instantaneously develop turbidity on the addition of the sludge. This precludes using turbidity alone as an indicator of microbial growth.

The biocides used in the evaluations are shown in the Table below.

| BIOCIDE TYPE | ACTIVE INGREDIENT (ai) | PERCENT ai |
|---|---|---|
| Phosphonium Salt | THPS | 75 |
| DBNPA | DBNPA | 98 |

EXAMPLES 1 TO 3

The performance of Phosphonium Salt in the concentration range 250 to 1000 mg/l is illustrated in FIG. 1 of the accompanying drawings. Concentrations of 250 and 500 mg/l gave similar results with a fairly flat time/kill response over the first 6 hours contact time, followed by a reduction in numbers to a total kill within 48 hours.

By contrast, the time/kill response at 1000 mg/l was much faster. The time/kill response over the first 6 hours contact time was more progressive and total kill was achieved within 24 hours.

Figure 2:
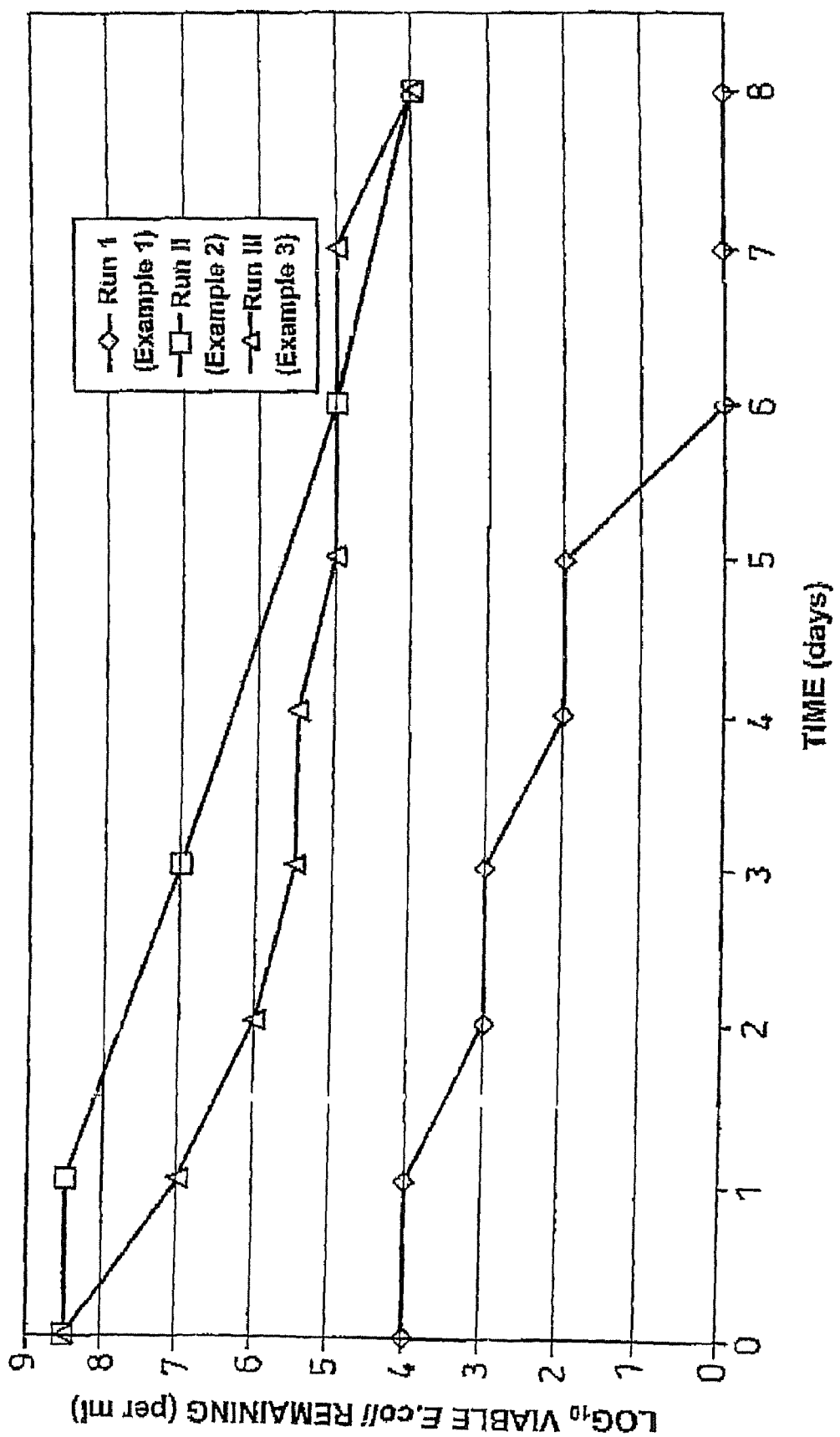
FIG. 2 illustrates the *E. coli* levels in untreated sludge.

For comparison, the *E. coli* levels in untreated sludge slowly decrease naturally, over a time period as shown in FIG. 2. Even starting at the low *E. coli* level of 104 cfu/gds it took 6 days to achieve total kill. Starting at the higher level of $10^{8.5}$ cfu/gds, the level had only reduced to 104 cfu/gds after 8 days. The benefit of phosphonium salt treatment (FIG. 1) is therefore effectively displayed.

EXAMPLE 4

Figure 3:
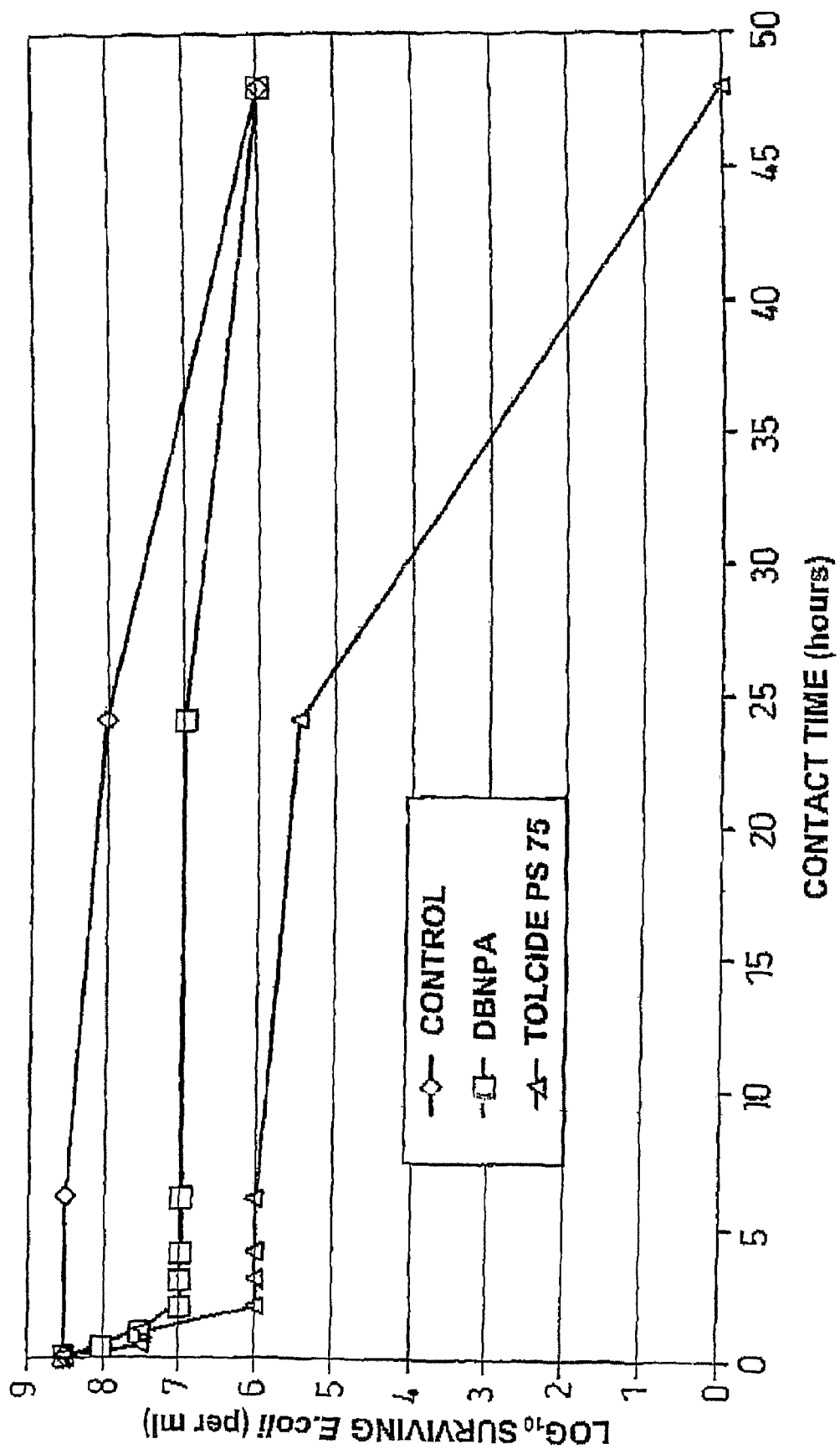
FIG. 3 illustrates the performance of Phosphonium Salt compared to that of dibromo-nitrilo-propionamide (DBNPA).

The performance of Phosphonium Salt compared to that of DBNPA, is shown in FIG. 3 of the accompanying drawings. Both biocides were tested at an equal active-ingredient concentration of 500 mg/l. DBNPA shows surprisingly poor antimicrobial performance, achieving only a 2.5 log reduction in numbers after 48 hours.

The foregoing Examples demonstrate the following characteristics of the present invention:

(a) Increasing the Phosphonium Salt concentration used in treatment from 500 to 1000 mg/l gives a significant improvement in performance.

(b) In all of the treatments evaluated total kill was achieved.

(c) When compared with the performance of DBNPA, the performance of Phosphonium Salt was superior.

EXAMPLE 5

Example 5

The performance of Phosphonium Salt for treating raw untreated sewage that has not undergone pre-treatment steps such as anaerobic digestion is shown in FIG. 4 of the accompanying drawings.

The performance of Phosphonium Salt was tested at an equal active-ingredient concentration of 375 mg/l and 500 mg/l.

A 3 log reduction in numbers of *E. Coli* was achieved after just over a minute of contact between the raw untreated sewage sludge and the Phosphonium Salt at a concentration of 500 mg/l and after just under two minutes of contact between the raw untreated sewage sludge and the Phosphonium Salt at a concentration of 375 mg/l.

The invention claimed is:

1. A method of treating sewage sludge to reduce the pathogen content of said sludge, the method comprising the steps of:
    (a) adding to the sludge an effective amount of a tetrakis (hydroxyorgano)phosphonium salt or compound of formula (I)

$$[R'R''(CH_2OH)_2P^+]_n X^{n-} \quad (I)$$ 

wherein:
    n is the valency of X;
    R' and R'', which may be the same or different, are each an alkyl, hydroxyalkyl, alkenyl or aryl moiety and X is an anion; and
    (b) keeping the tetrakis(hydroxyorgano)phosphonium salt or compound in contact with the sludge for sufficient time to give rise to a finally treated sludge wherein the total reduction in the amount of pathogens present is by an amount equivalent to a logarithmic reduction of 2 or more compared to the amount of pathogens present in untreated sludge.

2. The method as claimed in claim 1 wherein the tetrakis (hydroxyorgano)phosphonium salt or compound is added to untreated sewage sludge.

3. The method as claimed in claim 1 wherein the tetrakis (hydroxyorgano)phosphonium salt or compound is added to sewage sludge that has already undergone one or more treatments to reduce the total amount of pathogens present.

4. The method as claimed in claim 3 wherein the treatment to reduce the total amount of pathogens present is anaerobic digestion.

5. The method as claimed in claim 3 wherein the tetrakis (hydroxyorgano)phosphonium salt or compound is added to sludge that has already undergone one or more treatments to reduce the total amount of pathogens present in an amount effective to further reduce the amount of pathogens present such that the total reduction of the pathogen content, after pre-treatment and treatment with the phosphorus-containing compound, compared to untreated sludge is by an amount equivalent to a logarithmic reduction of 2 or more.

6. The method as claimed in claim 3 wherein total reduction in pathogen content achieved by the addition of the tetrakis(hydroxyorgano)phosphonium salt or compound is by an amount equivalent to a logarithmic reduction of less than 2.

7. The method as claimed in claim 1 in which R' and R'' are between 1 and 20 carbon atoms in length.

8. The method as claimed in claim 1 in which X is selected from the group consisting of chloride, sulphate, phosphate, acetate, oxalate and bromide.

9. The method as claimed in claim 1 in which the tetrakis (hydroxyorgano)phosphonium salt or compound is tetrakis (hydroxymethyl)phosphonium sulphate, tetrakis(hydroxymethyl)phosphonium chloride, tetrakis(hydroxymethyl)phosphonium bromide, tetrakis(hydroxymethyl)phosphonium phosphate, tetrakis(hydroxymethyl)phosphonium acetate, or tetrakis(hydroxymethyl)phosphonium oxalate.

10. The method as claimed in claim 1 in which the amount of the tetrakis(hydroxyorgano)phosphonium salt or compound to be added to the sludge in step (a) is up to 10,000 mg/l.

11. The method as claimed in claim 10 in which the amount of the tetrakis(hydroxyorgano)phosphonium salt or compound to be added to the sludge in step (a) is 100-2,500 mg/l.

12. The method as claimed in claim 11 in which the amount of the tetrakis(hydroxyorgano)phosphonium salt or compound to be added to the sludge in step (a) is 200-1,000 mg/l.

13. The method as claimed in claim 1 in which the amount of the tetrakis(hydroxyorgano)phosphonium salt or compound to be added to the sludge is expressed relative to dry solids weight and the amount to be added is up to about 30% by weight of dry solids.

14. The method as claimed in claim 13 in which the amount of the tetrakis(hydroxyorgano)phosphonium salt or compound to be added is from 0.1 to 20% by weight of dry solids.

15. The method as claimed in claim 14 in which the amount of the tetrakis(hydroxyorgano)phosphonium salt or compound to be added is from 0.1 to 10% by weight of dry solids.

16. The method as claimed in claim 13 in which the amount of the tetrakis(hydroxyorgano)phosphonium salt or compound to be added is from 0.2 to 5% by weight of dry solids.

17. The method as claimed in claim 13 in which the amount of the tetrakis(hydroxyorgano)phosphonium salt or compound to be added is from 0.4 to 2% by weight of dry solids.

18. The method as claimed in claim 1 in which step (b) is carried out over a period of from 1 second to 14 days.

19. The method as claimed in claim 18 in which step (b) is carried out over a period of from 6 to 24 hours.

20. The method as claimed in claim 18 in which step (b) is carried out over a period of from 15 seconds to 24 hours.

21. The method as claimed in claim 1 in which the pathogens present in the sludge are selected from the group consisting of bacteria, viruses, protozoans and helminths.

22. The method as claimed in claim 21 in which the bacteria are selected from the group consisting of *Escherichia coli, Salmonella* spp., *Shigella* spp., *Vibrio cholerae, Bacillus cereus, Listeria monocytogenes, Campylobacter* spp., and *Yersinia pestis*.

23. The method as claimed in claim 21 in which the viruses are selected from the group consisting of rotaviruses, calciviruses, group F adenoviruses and astroviruses.

24. The method as claimed in claim 21 in which the protozoans are selected from the group consisting of *Entamoeba* spp., *Giardia* spp., *Balantidium coli* and *Cryptosporidium* spp.

25. The method as claimed in claim 21 in which the helminths are selected from the group consisting *Ascaris lumbricoides* (roundworm), *Trichuris trichiura* (whipworm), *Ancylostoma duodenale* (hookworm), *Strongyloides stercoralis* (threadworm), *Schistosoma* spp., *Taenia saginata* (beef tapeworm), *Taenia solum* (pork tapeworm) and their eggs.

26. A sewage sludge that has been treated according to the method as claimed in claim 1.

27. The sewage sludge as claimed in claim 26 wherein the sludge is a liquid sludge.

28. The sewage sludge as claimed in claim 26 wherein the sludge is at least partially dewatered to form a sludge cake.

29. A method of treating sewage sludge to reduce the pathogen content of said sludge, the method comprising the steps of:
    (a) adding to the sludge an effective amount of an alkyl-substituted phosphine as shown in formula (II):

$$(CH_2OHR_2)P \quad (II)$$ 

wherein:
each R, which may be the same or different, is selected from a alkyl, hydroxyalkyl, alkenyl or aryl moiety; and
(b) keeping the alkyl-substituted phosphine in contact with the sludge for sufficient time to give rise to a finally treated sludge wherein the total reduction in the amount of pathogens present is by an amount equivalent to a logarithmic reduction of 2 or more compared to the amount of pathogens present in untreated sludge.

30. The method as claimed in claim 29 wherein the alkyl-substituted phosphine is added to untreated sewage sludge.

31. The method as claimed in claim 29 wherein the alkyl-substituted phosphine is added to sewage sludge that has already undergone one or more treatments to reduce the total amount of pathogens present.

32. The method as claimed in claim 31 wherein the treatment to reduce the total amount of pathogens present is anaerobic digestion.

33. The method as claimed in claim 31 wherein the alkyl-substituted phosphine is added to sludge that has already undergone one or more treatments to reduce the total amount of pathogens present in an amount effective to further reduce the amount of pathogens present such that the total reduction of the pathogen content, after pre-treatment and treatment with the phosphorus-containing compound, compared to untreated sludge is by an amount equivalent to a logarithmic reduction of 2 or more.

34. The method as claimed in claim 31 wherein total reduction in pathogen content achieved by the addition of the alkyl-substituted phosphine is by an amount equivalent to a logarithmic reduction of less than 2.

35. The method as claimed in claim 29 in which the amount of the alkyl-substituted phosphine to be added to the sludge in step (a) is up to 10,000 mg/l.

36. A method as claimed in claim 29 in which the amount of the alkyl-substituted phosphine to be added to the sludge is expressed relative to dry solids weight and the amount to be added is up to about 30% by weight of dry solids.

37. The method as claimed in claim 29 in which step (b) is carried out over a period of from 1 second to 14 days.

38. The method as claimed in claim 29 in which the pathogens present in the sludge are selected from the group consisting of bacteria, viruses, protozoans and helminths.

39. A sewage sludge that has been treated according to the method as claimed in claim 29.

* * * * *